Nov. 13, 1934.                    W. L. AVERY                    1,980,567
            APPARATUS AND PROCESS FOR THE MANUFACTURE OF PNEUMATIC TIRES
                      Original Filed Oct. 19, 1927    2 Sheets-Sheet 1
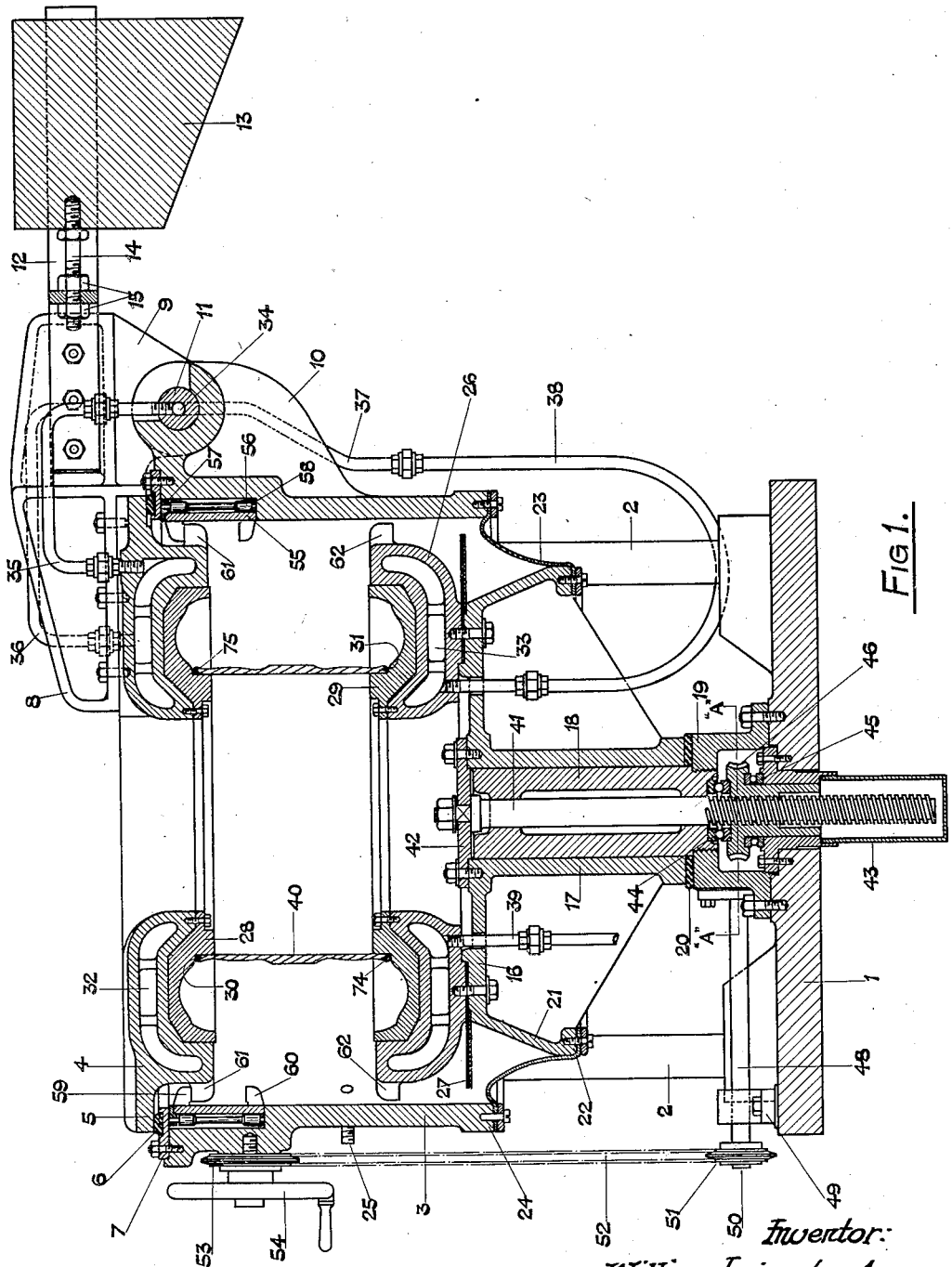

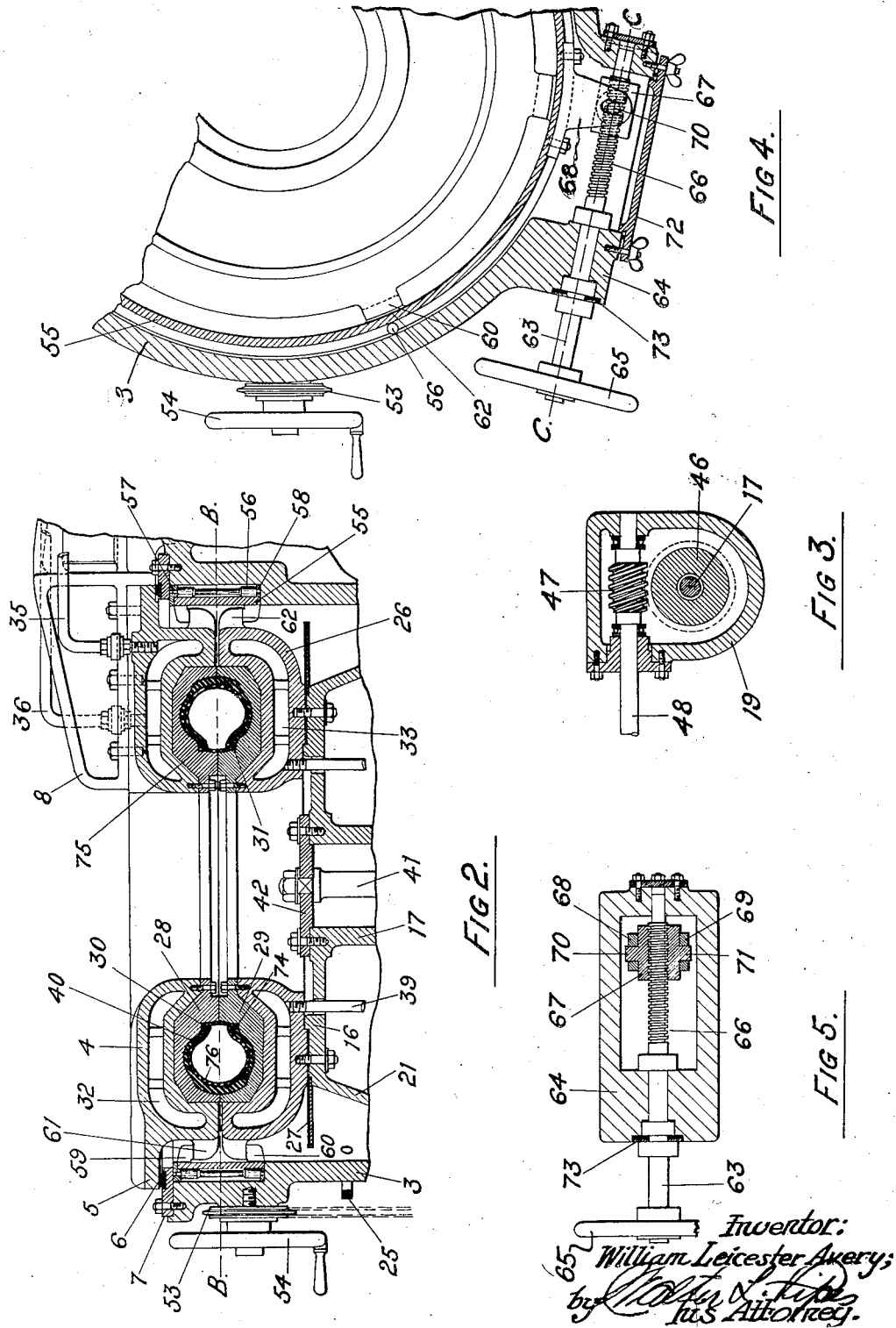

Patented Nov. 13, 1934

1,980,567

UNITED STATES PATENT OFFICE 1,980,567

APPARATUS AND PROCESS FOR THE MANUFACTURE OF PNEUMATIC TIRES

William Leicester Avery, Bishop's Stortford, England, assignor to United States Rubber Company, New York, N. Y., a corporation of New Jersey Application October 19, 1927, Serial No. 227,101. Renewed October 27, 1932. In Great Britain October 22, 1926

4 Claims. (Cl. 18—17)

In a known method of tire casing manufacture the casing is first built up in the form of an endless band which is substantially flat or crowned transversely, then shaped to its tire form by suitable shaping means and subsequently moulded and vulcanized under internal fluid pressure in a mould of suitable form.

It has been proposed to shape the endless band to tire form in shaping apparatus comprising a hollow annular chamber open only on its inner periphery, said chamber being adapted to cooperate with the endless tire band to form therewith exterior thereto a closed chamber, said apparatus having means for creating a vacuum in the chamber thus formed in order to expand the tire band to tire shape therein. With such apparatus the shaped tire band has positioned therein a retaining device such as an expanding ring or air tube and is thereafter removed from the shaping apparatus and arranged for moulding and vulcanization between mould members having opposed profiled moulding surfaces.

The object of this invention is to provide apparatus for manufacturing tire casings from endless tire bands in which the tire band is shaped by fluid pressure acting directly on the inside thereof and which is such that in use the operations of shaping the band and arranging it between opposed profiled moulding surfaces are combined and which preferably also provides means for moulding and vulcanizing the shaped tire casing between said moulding surfaces while still in said apparatus.

According to this invention apparatus for manufacturing tire casings from endless tire bands comprises a hollow annular chamber open only on its inner periphery and adapted to cooperate with an endless tire band to form therewith exterior thereto a closed chamber, the said hollow annular chamber having communicating therewith a conduit or the like adapted to be associated with means to create in said closed chamber a pressure substantially lower than that acting on the inside of said tire band in order to expand said tire band to substantially tire shape therein, and the opposed side walls of said annular chamber having opposed interior surfaces profiled to form moulding surfaces between which the tire casing is moulded and vulcanized.

Conveniently the aforesaid conduit or the like is associated with exhausting means to create in said closed chamber a vacuum or partial vacuum.

Preferably the opposed side walls of said hollow annular chamber have heating means therein or thereabout, for example steam cavities therein, for the purpose of moulding and vulcanizing the shaped tire band while in the apparatus.

In the accompanying drawings which illustrate this invention according to the preferred embodiment thereof:

Figure 1 shows the apparatus in vertical cross-section with the opposed side-walls of the annular chamber separated to the required extent to receive the endless tire band to be formed into a tire casing, and an endless tire band being shown in position therein.

Figure 2 shows a similar view of a portion of the apparatus shown in Figure 1 with the opposed side-walls of the chamber locked together and thereby forming therebetween a mould cavity, a shaped tire band being shown in said mould cavity.

Figure 3 is a cross-sectional view on the line A—A on Figure 1.

Figure 4 is a cross-sectional view of a portion of the apparatus on the line B—B in Figure 2 to show the operation of locking means to lock the side-walls of the chamber together for moulding and vulcanizing a tire casing therebetween.

Figure 5 is a cross-sectional view on the line C—C in Figure 4.

Referring to Figures 1 and 2 a base 1 has positioned around its circumference a plurality of vertical pillars 2 which support a cylindrical frame member 3, the central throughway axis of which is vertical in respect to said base member. Supported by the frame member 3 is an annular upper steam chest 4 which has a circumferential extension 5 which rests upon the upper circumferential edge of the frame member 3. A packing gasket 6 carried in a dovetail groove in a ring 7 around the circumferential edge of the frame member 3 enures a fluid-tight joint between said steam-chest 4 and member 3 while allowing said chest to be removed from said member. Bolted to the steam-chest 4 is a bracket 8 which is hinged at 9 to a bracket 10 extending from the side of the frame member 3, the hinge pin 11 being made fast to the bracket 8. Extending from said bracket 8 in a direction away from the chest 4 is an arm 12 along which slides a counterbalance weight 13. The position of the weight 13 is adjustably determined by the threaded rod 14 and nuts 15 thereon, the said rod extending from the bracket to said weight. The position of the weight 13 is so adjusted that when the chest 4 is raised said chest remains in any desired position.

A circular platform member 16 is positioned to rise and fall within said frame member 3, said member 16 having a central depending hollow cylindrical sleeve 17 which slides telescopically over a guide pillar 18 which extends vertically from a hollow boss 19 centrally secured to the base 1. A rubber ring 20 surrounds the top of the boss 19 to form a cushion stop for the lower end of the sleeve 17. The platform member 16 has a downward sloping marginal portion 21 to the circumferential edge 22 of which is clamped the inner edge of an annular diaphragm 23 of flexible material such as rubber reinforced with canvas. The outer edge of said diaphragm 23 is clamped to the lower circumferential edge 24 of the frame member 3, the diaphragm thereby affording a fluid-tight joint between the platform member 16 and the frame member 3 while permitting the member 16 to rise and fall within the member 3. A conduit 25 extends through the wall of the frame member 3, said conduit being adapted to be associated with exhausting means for exhausting the air from the chamber formed within said frame member as hereinafter described.

To the top of the platform 16 is bolted a lower steam-chest 26, between said members being inserted an annular sheet 27 of heat-resisting material, such as asbestos, said sheet 27 extending beyond the steam-chest 26 so as to shield the diaphragm 23 as much as possible from the heat radiated from the chest 26.

The opposing sides of the steam-chests 4 and 26 have removable liners or shell portions 28 and 29 the opposing faces of which are profiled to form moulding surfaces which are such that when said steam-chests are brought together as shown in Figure 2 there is formed therebetween a mould cavity of the desired contour for moulding and vulcanizing therein the shaped tire casing. The liners 28 and 29 are profiled so as to form a cavity suitable for a tire casing of the inextensible edge type, and the tire edge cavities 30 and 31 therein provide tire edge receiving grooves which, as shown in Figure 1, locate the circumferential edges of the tire band when positioned in the apparatus. The said tire edge grooves snugly receive the tire band edges forming between the steam-chests and said tire band joints which are sufficiently fluid-tight for the purpose of the shaping operation.

As shown by Figs. 1 and 2, both the steam-chest 4 and its liner 28 are provided with a passageway materially smaller than the endless tire band 40, yet sufficiently large to permit the insertion of an air bag therethrough.

The steam-chests 4 and 26 have steam cavities 32 and 33 therein which are arranged to surround as far as possible the moulding surfaces in said chests. Any suitable arrangement of conduits may be used to supply steam to the chests 4 and 26, the conduits shown in the drawings being arranged for a convenient method in which the steam supply is led to a channel 34 extending a short distance along the axis of the hinge pin adjacent one end thereof. The steam supply conduit which is not shown communicates with the end of said channel 34 through a gland which is also not shown and a conduit 35 extends from the pin 11 communicating with the channel 34 therein to the steam cavity 32 from which a similar conduit 36 extends to the other end of said pin 11 communicating with a channel similar to 34 but adjacent said other end of the hinge pin 11, but not in communication with said channel 34. With the end of the channel with which conduit 36 communicates a conduit 37 communicates through a gland which is not shown in the drawings, the said conduit 37 having a flexible portion 38 and communicating therethrough with the steam cavity 33. A steam exhaust conduit 39 carries the steam away from the cavity 33. It will be thus appreciated that with the arrangement indicated the steam first enters the cavity 32 and passes therefrom to the cavity 33, and further that the circulation of the steam through the chests can continue whatever may be the position of the steam-chests.

The frame member 3, the upper steam-chest 4, the portion 21 of the platform member 16, the diaphragm 23 and lower steam-chest 26 together form a hollow annular chamber normally open at its inner periphery, and when a tire band such as 40 is positioned between the tire edge receiving grooves in the chests 4 and 26, as in Figure 1, form with said tire band exterior thereto a closed chamber. The exhaustion of the air from said chamber not only expands the tire band therein but tends to cause said platform member 16 to rise, and means independent of the exhaustion of said chamber are provided whereby the rise and subsequent fall of the said member may be controlled or regulated or whereby said member may be caused to rise as required at times when the air is not exhausted from the said closed chamber.

Referring to Figures 1 and 3 a spindle 41 extends vertically upward through the guide pillar 18 the upper end of said spindle extending beyond said guide pillar and being rotatably secured in a plate 42 bolted to the platform member 16 across the upper end of the sleeve 17. The lower end of the spindle 41 is threaded and extends through the hollow boss 19 and through the base 1, entering a cylindrical shield 43 below the base of the apparatus. Mounted between ball thrust races 44 and 45 in the boss 19 is a worm wheel 46 through the centre of which passes in threaded engagement the spindle 41. The worm wheel 46 meshes with a worm 47 on the end of a shaft 48 which is rotatably mounted in the wall of the boss 19, extending thereto from adjacent the edge of the base 1. Said shaft 48 is rotatably supported by a bracket 49 secured to the base 1 and has keyed to the end 50 a sprocket 51 which is connected by a chain 52 with a sprocket 53 rotatably carried on a spindle extending horizontally from the side of the member 3. The sprocket 53 is attached to a hand wheel 54 and it will be appreciated that the platform member can be caused to rise by the rotation of said hand wheel or the rise or fall of said member regulated or controlled thereby.

Means for locking the steam-chests 4 and 26 together in the position shown in Figure 2 is shown with reference to Figures 1, 2, 4 and 5, and comprises a locking ring 55 mounted so as to be capable of rotary movement around and in relation to the inner periphery of the frame member 3 in a recess therein adjacent the upper edge thereof. Between the locking ring 55 and wall of the frame member 3 are a plurality of anti-friction rollers 56 rotatably carried in rings 57 and 58. Extending inwardly from said locking ring are a plurality of upper and lower projections 59 and 60 respectively, said projections being so arranged that upon partial rotation of the ring 55 when the chests are together, said projections engage projections 61 and 62 respectively in the upper and lower chests, the meeting faces of said projections being of complementary wedge form so that the steam-chests 4 and 26 are forced together. Figure 4 shows the ring 55 in the locking position, the projections 60 being indicated as being in engagement with the projections 62 of the lower steam-chest.

To rotate the locking ring 55 a spindle 63 is mounted horizontally across a housing 64 in the wall of the frame member 3, one end of said spindle projecting from said housing and having a hand wheel 65 secured thereto. The spindle is rotatably mounted across the side-walls of said housing 64 and has a threaded portion 66 therebetween which carries an internally threaded block 67. The housing 64 is open towards the locking ring 55 and lugs 68 and 69 project therefrom and embrace the block 67, said lugs having slots which engage bosses 70 and 71 extending respectively upwardly and downwardly from the block 67. It will be seen that rotation of the hand wheel 65 will apply the required rotary movement to the locking ring 55. The housing 64 has a detachable fluid-tight inspection plate 72 and a fluid-tight packing 73 is provided where the spindle 63 passes through the wall of the housing 64.

To shape, mould and vulcanize a tire band to form a tire casing in the aforesaid apparatus, the upper steam-chest 4 is raised from the frame member 3 and the platform member being in or near its bottom position, the endless tire band 40 is inserted between the upper steam-chest 4 and the frame member 3, and dropped on the platform member with the edge 74 of the band registering with the tire edge cavity 31 in the lower steam-chest 26. By so dropping the endless tire band on the platform, an accurate registration may be obtained with a minimum expenditure of time and supervision, and without interference either from the steam chest or liner 28. The upper chest 4 is then lowered and the wheel 54 operated if required to cause the edges 74 and 75 of the tire band to press into the respective cavities in the steam-chests. The tire band in this position is shown in Figure 1. The air is now exhausted from the thus formed closed chamber and the platform member 16 allowed to rise under the control of the hand wheel 54, with the result that the tire band is expanded outwardly and the circumferential edge portions approach one another. When the chest 4 has approached the chest 26 so as to leave only a sufficient gap for the purpose, an annular air-bag 76 of known form is inserted in the partially shaped casing and the chests then allowed to come together, the valve (not shown) of the air-bag extending inwardly between the chests in radial grooves suitably positioned in the meeting faces thereof. The locking ring is then operated by the hand wheel 65 to lock the chests together, and air under pressure supplied to the air-bag through its valve and the casing vulcanized by the heat supplied from steam circulating through the cavities in the chests. This stage of the operation is shown in Figure 2.

When vulcanization of the casing is completed the pressure in the air-bag is released, the steam-chests unlocked and the upper chest raised to remove the completed tire casing from the apparatus. The platform member is then allowed to drop towards the base 1 in readiness to receive another endless band to be moulded and vulcanized.

Instead of providing heating means in the opposed side walls of the chamber, the side walls or portions thereof including the opposed profiled interior surfaces thereof may be so arranged as to be removable from the apparatus with the shaped tire band therebetween for placing in a suitable heating chamber for effecting the moulding and vulcanizing of the casing.

Many other modifications and variations could be made without departing from the scope of the invention as defined in the appended claims.

In a modification which may conveniently be mentioned as a further example, the profiled surface for moulding the tread portion of the tire cover, instead of being provided in the opposed surfaces of the side walls of the annular chamber as in the embodiment of the invention just described and illustrated in the drawings, is provided in the internal periphery of a separate ring which is mounted between said side walls and so guided that the said surface therein provided assumes its correct position relative to the profiled surfaces in said side walls when said side walls are in proximity to one another in the position for moulding and vulcanizing a tire cover therebetween.

I claim:—

1. A process for manufacturing pneumatic tires which comprises building an endless pulley-band, simultaneously shaping the pulley-band partially to tire form and positioning it within the molding members, introducing a bag within the partially shaped casing, completely shaping the casing to tire form and positioning it within the molding members with a bag therewithin, supplying fluid under pressure to the bag, and finally vulcanizing the tire.

2. A tire shaping machine comprising a plurality of relatively movable shaping sections, a frame surrounding said sections, locking means carried by said sections, and a circumferentially movable member mounted in said frame and having means for engaging and securing the locking means on said sections.

3. In an apparatus for expanding pulley bands, a closed chamber provided with side walls in opposed relation having cooperating molding surfaces, at least one of said side walls being provided with a passageway materially smaller than the pulley band to be expanded yet sufficiently large to permit the insertion of an air-bag therethrough, a connection between said side wall and the remainder of the chamber, and said side wall being movable away from the remainder of the chamber, while maintaining said connection, to a position permitting the insertion of an unexpended pulley band between the side wall and the remainder of the chamber.

4. In an apparatus for expanding pulley bands, a closed chamber provided with side walls in opposed relation having cooperating molding surfaces, said side walls being provided with means for heating the said molding surfaces, at least one of said side walls being provided with a passageway materially smaller than the pulley band to be expanded yet sufficiently large to permit the insertion of an air-bag therethrough, a connection between said side wall and the remainder of the chamber, and said side wall being movable away from the remainder of the chamber to a position permitting the insertion of an unexpanded pulley band between the side wall and the remainder of the chamber.

WILLIAM LEICESTER AVERY.